Oct. 23, 1945.           W. P. COUSINO           2,387,236
                      SPEED CONTROL FOR ENGINES
                        Filed Feb. 19, 1944
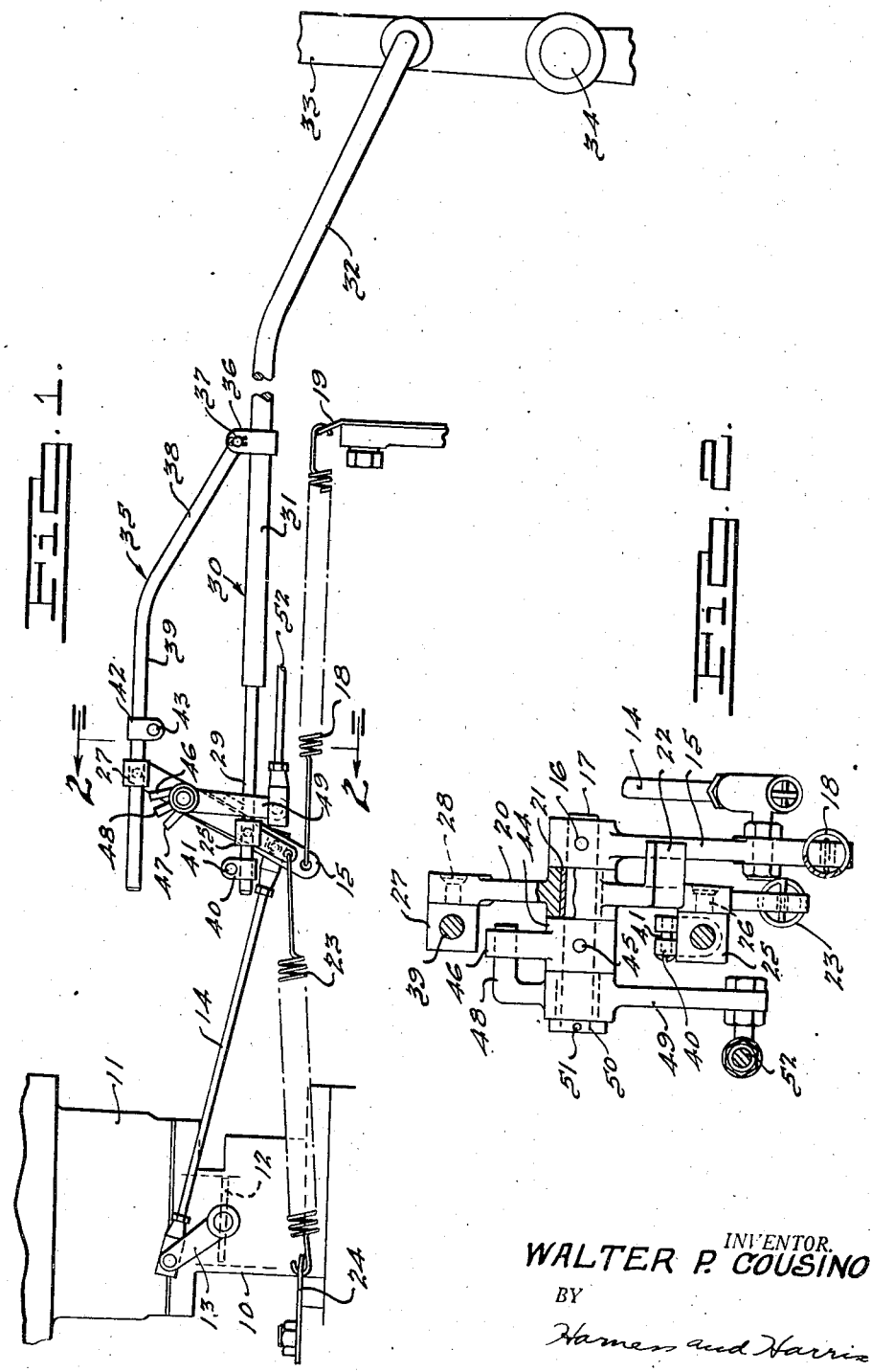
INVENTOR.
WALTER P. COUSINO
BY
*Hamess and Harris*
ATTORNEYS.

Patented Oct. 23, 1945

2,387,236

UNITED STATES PATENT OFFICE 2,387,236

SPEED CONTROL FOR ENGINES

Walter P. Cousino, Detroit, Mich., assignor to Chrysler Corporation, Highland Park, Mich., a corporation of Delaware Application February 19, 1944, Serial No. 523,162

7 Claims. (Cl. 74—472)

This application relates to means for decelerating and accelerating an engine. More specifically it relates to means for controlling a throttle valve for an engine operable upon interruption and resumption of a driving connection between the engine and part or parts to be driven, such as a transmission.

In the copending application of Wallace et al., Serial No. 522,254, filed February 14, 1944, there is claimed broadly a means for controlling the feeding of fuel to an engine to regulate engine speed upon movement of a control member for the engine transmission to and from neutral from and to different drive-transmitting arrangements such as forward and reverse, and specifically a certain means disclosed in said copending application for accomplishing this result.

The present application claims a certain modified form for this arrangement that has certain distinct advantages.

An object of the present invention is to provide improvements in means for decelerating and accelerating engine by throttle control exerted by shifting of a control member for a transmission to and from neutral from and to one drive-transmitting arrangement and from and to another drive-transmitting arrangement. In a more limited sense, this involves the forward and rearward shifting of the control member to and from neutral from and to reverse and the rearward and forward shifting of the control member to and from neutral from and to forward.

Another object is to coordinate the above arrangement with a hand-operated throttle control that the engine may be accelerated and decelerated independently of the positioning of the control member for the transmission.

A further object is to provide an improved arrangement for automatically causing, during shifting of a transmission from one drive-transmitting arrangement through neutral to another drive-transmitting arrangement, the engine associated with the transmission to be decelerated when the transmission is in neutral.

A still further object is to provide an improved arrangement by which it is impossible for an operator to cause a transmission-shifting member to make an engine operate at high speed when the transmission is in neutral.

Other objects will appear from the disclosure.

In the drawing,

Fig. 1 is a side view illustrating the novel construction of the present invention; and Fig. 2 is a sectional view taken on the line 2—2 of Fig. 1.

Reference character 10 designates an intake line leading to a manifold 11 of an engine not otherwise shown. Positioned within the intake line 10 is a throttle valve 12 to which is secured an arm 13. A link 14 connects the arm 13 and an arm 15 pinned, as indicated, at 16 to a rockshaft 17. A relatively weak spring 18 connects the lever or arm 15 with a bracket 19 and urges the arm 15 in counterclockwise direction as viewed in Fig. 1 and the arm 13 and the throttle valve 12 in clockwise direction. The throttle valve is shown in closed or idle position and the clockwise movement urged upon it by the spring 18 would move it to an open position.

A part 20 is rotatably mounted at a mid point by means of a bushing 21 upon rockshaft 17. A lug 22 upon the part 20 projects laterally into engagement with one side of the arm 15. A relatively strong spring 23 connects the lower end of the part 20 with a bracket 24 and urges the part 20 in clockwise direction as viewed in Fig. 1. A sleeve 25 is pivotally connected by a rivet 26 to a lower portion of the part 20. A sleeve 27 is pivotally connected by a rivet 28 to the upper end of the part 20. Sleeve 25 forms a slidable support for a reduced end 29 of a link 30 formed of two angularly related portions 31 and 32. The other end of the link 30 is connected by the portion 32 to a gearshift lever or control member 33 for a transmission, not shown. The control member 33 is pivoted at 34. A link 35 is pivotally connected to a mid point of the link 30 on the portion 31 on a clamp 36 secured to the link 30. The pivot of the link 35 on the clamp 36 is indicated at 37. The link 35 is formed of angularly related portions 38 and 39, the portion 38 extending at an angle to the link 30 and permitting the portion 39 to extend in generally parallel spaced relation with respect to the link 30. The sleeve 27 at the upper end of the part 20 slidably receives the portion 39 of the link 35. A U-shaped member 40 clamped to the reduced portion 29 of the link 30 by a screw 41 forms an abutment piece engageable with the sleeve 25. A similar U-shaped member 42 clamped to the portion 39 of the link 35 by a screw 32 forms an abutment piece engageable with the sleeve 27.

The transmission, not shown, may be of the type shown in Fromm Patent No. 1,954,200 which in brief involves a single forward speed and a reverse, shifting being accomplished without a clutch by the movement of the shift rod from, for example, reverse position to neutral and from neutral to forward position or vice versa. In the present application the gear shift or control member 33 is shown in a neutral position for the transmission. In this position the sleeves 25 and 27 slidably supporting the links 30 and 35, are out of engagement with the abutment pieces 40 and 42. The throttle valve 12 is in closed or idle position, because the spring 23 overcoming the spring 18 has caused the part 20 to assume the position shown, bringing the lug 22 to engagement with the arm 15 moving it to the position shown. This insures a closed or idle position of the throttle 12. Let it be assumed now that the transmission is to be shifted to forward speed. This may be accomplished by movement of the control member 33 to the left of the position shown. The links 31 and 35 are moved to the left and the abutment piece 42 is brought into engagement with the sleeve 27 on the upper end of the part 20 causing the part 20 to be moved counterclockwise against the action of the spring 23. The lug 22 on the part 20 moves to the right out of engagement with the arm 15 controlling the throttle 12 and the spring 18 causes the arm 15 to follow the part 20 in counterclockwise movement rotating the throttle 12 clockwise to open position. A movement to the right of the control member 33 back to the position shown in Fig. 1 shifts the transmission from forward speed to neutral. This movement causes the links 30 and 35 to be moved to the right, the abutment piece 42 being moved to the right out of engagement with the sleeve 27. This allows the part 20 to be rotated clockwise back to the position shown under the action of the spring 23. The lug 22 engages the right side of the arm 15 causing that arm to be rotated clockwise, bringing the throttle 12 back to the idle or closed position shown. When the transmission is to be shifted to reverse speed, the control member 33 is shifted from the neutral position shown to the right. The resulting movement to the right of the links 30 and 35 causes the abutment piece 40 to engage sleeve 25 and to move it to the right, bringing about counterclockwise rotation of the part 20. The lug 22 is moved to the right out of engagement with the arm 15 and the spring 18 acts on the arm 15 to cause it to follow the part 20 in counterclockwise rotation, causing the throttle valve 12 to be moved to open position. Shifting of the transmission from reverse speed to neutral is accomplished by movement of the control member 33 to the position shown in Fig. 1. The links 30 and 35 are moved to the left and the abutment piece 40 is moved to the left out of engagement with the sleeve 25. This permits the spring 23 to cause part 20 to be rotated clockwise and the lug 22 on the part 20 causes the arm 15 also to be rotated clockwise to the position shown in Fig. 1. This causes a return of the throttle 12 to the closed or idle position.

At certain times it may be desirable to have the throttle valve 12 in open position when the transmission is in neutral; for example, an open position may be demanded when the engine is being started. Likewise it may be desirable to establish variable limits to the open position and to the idle position of the throttle valve 12. An element 44 is pinned to the rockshaft 17 as indicated at 45. It is provided with spaced ears 46 and 47 which receive between them laterally projecting lug 48 formed on an arm 49 rotatably mounted upon the rockshaft 17 and held thereon by a collar 50 pinned to the rockshaft at 51. Link 52 is pivotally connected to the arm 49 and may extend to a remote point at which manual control may be had. Since the arm 45 and the element 44 are both pinned to the rockshaft 17, the arm and the part rotate as one. When the throttle valve 12 is rotated from the idle or closed position to an open position, the attendant counterclockwise rotation of the arm 15 moves the ear 46 into engagement with the lug 48. This engagement limits the movement of the arm 15 and so establishes the open position of the throttle valve 12. Movement of the control member 33 from neutral either to forward or to reverse will not interfere with an open throttle position less than full open, for the abutment pieces 40 and 42 force only the part 20, not arm 15, in a counterclockwise direction. The arm 15 follows the part 20 counterclockwise only because of the action of the spring 18, since the lug 22 on the lever 20 can cause the lever 50 to move only in a clockwise direction. When the throttle valve 12 moves to a closed or idle position, the clockwise rotation of the lever 15 causes the ear 47 to engage the lug 48, and thus a limit to the closed position of the throttle valve is obtained. Stopping of the throttle in an idle position less than lowest idle or completely closed position by a limit to clockwise movement of the arm 15 is possible, because, although the lug 22 causes the part 20 to move the arm 15 clockwise, the spring 23 yieldingly, rather than positively, moves the part 20 clockwise. Since the ears 46 and 47 are part of the same piece, they move conjointly, and so an increasing of the open position of the throttle valve 12 will also increase the opening of the idle position. If it is desired to open the throttle valve 12 on starting when the transmission is in neutral position, the link 52 is moved to the right causing the lug 48 to engage the ear 47 and to rotate element 44 and the lever 15 counterclockwise against the action of the spring 23. Thus the throttle valve 12 is moved to open position. This will take place with no effect upon the transmission for the sleeves 25 and 27 merely move away from the abutment pieces 40 and 42 and the control member 33 for the transmission is not moved.

The transmission may be so arranged as to be shifted to forward or to reverse upon only a slight movement of the control member 33 away from the neutral position. At this point the throttle valve will have opened only slightly and will continue to open as the control member 33 moves to extreme positions in forward or in reverse. Thus the engine is speeded up gradually upon shifting. It is possible by this arrangement to use the control member 33 as a speed control when the transmission is driving.

It will be apparent from the foregoing description that a new and novel construction has been provided for decelerating an engine upon shifting to neutral of the engine transmission from either of two drive transmitting positions and for accelerating the engine upon shifting from neutral to either of the drive transmitting positions. The intention is to limit the invention only within the scope of the appended claims.

I claim:

1. In combination, means for feeding fuel to an engine including a valve movable in a certain direction from an idle position to an open position and in the opposite direction from the open position to the idle position, a control member for a transmission associated with the engine shiftable in one direction from neutral to a first drive-transmitting arrangement and in another direction from neutral to a second drive-transmitting arrangement, and means connecting the control member and the valve for causing shifting of the control member from neutral to the first drive-transmitting arrangement or from neutral to the second drive-transmitting arrangement to move the valve in the said certain direction from idle position toward open position, said connecting means comprising a part pivoted at a mid point, link means connecting the control member and portions of the part at opposite sides of its pivot for causing shifting of the control member from neutral to the first drive-transmitting arrangement or to the second drive-transmitting arrangement to move the part angularly in a certain direction from a first position to a second position, an arm pivoted adjacent the part, means connecting the arm and the valve of the fuel-feeding means, relatively strong resilient means urging the part from the second position to the first position upon shifting of the control member to neutral either from the first drive-transmitting arrangement or from the second drive-transmitting arrangement, a lug on the part engageable with the arm to move the arm and the valve to idle position upon movement of the part to its first position due to shifting of the control member to neutral but leaving the arm and the valve free upon movement of the part to its second position due to shifting of the control member to either drive-transmitting arrangement, and relatively weak resilient means urging the arm to follow the part upon its movement to its second position for moving the valve to open position.

2. In combination, means for feeding fuel to an engine including a valve movable in a certain direction from an idle position to an open position and in the opposite direction from the open position to the idle position, a control member for a transmission associated with the engine shiftable in one direction from neutral to a first drive-transmitting arrangement and in another direction from neutral to a second drive-transmitting arrangement, and means connecting the control member and the valve for causing shifting of the control member from neutral to the first drive-transmitting arrangement or from neutral to the second drive-transmitting arrangement to move the valve in the said certain direction from idle position toward open position, said connecting means comprising a part pivoted at a mid point and having a lug, means connecting the control member and portions of the part at opposite sides of its pivot for causing shifting of the control member from neutral either to the first drive-transmitting arrangement or to the second drive-transmitting arrangement to move the part angularly in the same direction from a first position to a second position, an arm engageable by the lug on the part, means connecting the arm and the valve of the fuel-feeding means, and manual means for controlling the valve independently of the control exerted by the positioning of the control member, said manual means comprising a pivotally mounted hand lever having a lug, and an element secured to the arm and having spaced ears receiving the lug of the hand lever between them, the engagement of the lug with one ear determining a position of minimum opening for the valve and the engagement of the lug with the other ear determining a position of maximum opening for the valve.

3. In combination, means for feeding fuel to an engine including a valve movable in a certain direction from an idle position to an open position and in the opposite direction from the open position to the idle position, a control member for a transmission associated with the engine shiftable in one direction from neutral to a first drive-transmitting arrangement and in another direction from neutral to a second drive-transmitting arrangement, and means connecting the control member and the valve for causing shifting of the control member from neutral to the first drive-transmitting arrangement or from neutral to the second drive-transmitting arrangement to move the valve in the said certain direction from idle position toward open position, said connecting means comprising a part pivoted at a mid point, link means connecting the control member and portions of the part at opposite sides of its pivot for causing shifting of the control member from neutral to the first drive-transmitting arrangement or to the second drive-transmitting arrangement to move the lever angularly in a certain direction from a first position to a second position, an arm pivoted adjacent the part, means connecting the arm and the valve of the fuel-feeding means, relatively strong resilient means urging the part from the second position to the first position upon shifting of the control member to neutral either from the first drive-transmitting arrangement or from the second drive-transmitting arrangement, a lug on the part engageable with the arm to move the arm and the valve to idle position upon movement of the part to its first position due to shifting of the control member to neutral but leaving the arm and the valve free upon movement of the part to its second position due to shifting of the control member to either drive-transmitting arrangement, relatively weak resilient means urging the arm to follow the part upon its movement to its second position for moving the valve to open position, means connecting the arm and the valve of the fuel-feeding means, and manual means for controlling the valve independently of the control exerted by the positioning of the control member, said manual means comprising a pivotally mounted hand lever having a lug, and an element secured to the arm and having spaced ears receiving the lug of the hand lever between them, the engagement of the lug with one ear determining a position of minimum opening for the valve and the engagement of the lug with the other ear determining a position of maximum opening for the valve.

4. In combination, means for feeding fuel to an engine including a valve movable between an idle position and an open position, a control member for a transmission associated with the engine shiftable in one direction from neutral to a first drive-transmitting arrangement and in another direction from neutral to a second drive-transmitting arrangement, a first movable part, means connected with the control member for causing shifting of the control member from the neutral to the first drive-transmitting arrangement or from neutral to the second drive transmitting arrangement to push the first movable part from a first position to a second position, relatively strong resilient means urging the first movable part from the second position to the first position upon shifting of the control member to neutral either from the first drive-transmitting arrangement or from the second drive-transmitting arrangement, a second movable part adapted to be moved in one direction through being pushed by the first movable part in its movement from the second position to the first position under the action of the relatively strong resilient means, relatively weak resilient means urging the second movable part in the opposite direction, and means connecting the second movable part and the valve for causing movement of the second movable part in the one direction to move the valve from open position toward closed position and movement of the second movable part in the opposite direction to move the valve from closed position toward open position.

5. The combination specified in claim 4 and further comprising a pair of spaced ears associated with the second movable part, and a manually positionable means including a lug located between the ears, the engagement of one ear with the lug determining a position of minimum opening for the valve and engagement of the other ear with the lug determining a position of maximum opening for the valve.

6. In combination, means for feeding fuel to an engine including a valve movable between an idle position and an open position, a control member shiftable in one direction from a neutral position to establish a certain condition and in another direction from a neutral position to establish another certain condition, a first movable part, means connecting the control member and the first movable part for causing shifting of the control member in either of the said directions from the neutral position to push the first movable part from a first position to a second position, relatively strong resilient means urging the first movable part from the second position to the first position upon shifting of the control member to the neutral position, a second movable part adapted to be moved in one direction through being pushed by the first movable part in its movement from the second position to the first position under the action of the relatively strong resilient means, relatively weak resilient means urging the second movable part in the opposite direction, and means connecting the second movable part and the valve for causing movement of the second movable part in the said one direction to move the valve from open position toward closed position and movement of the second movable part in the said opposite direction to move the valve from closed position toward open position.

7. The combination specified in claim 6 and further comprising a pair of spaced ears associated with the second movable part and a manually positionable means including a lug located between the ears, the engagement of one ear with the lug determining a position of minimum opening for the valve and engagement of the other ear with the lug determining a position of maximum opening for the valve.

WALTER P. COUSINO.